TUNNEL DIODE MEMORY WITH NONDESTRUCTIVE READOUT

Filed July 11, 1961 2 Sheets-Sheet 1

INVENTORS
JAMES C. MILLER
KAM LI
BY Howard W. Hermann
AGENT.

INVENTORS
JAMES C. MILLER
KAM LI

BY Howard W. Hermann
AGENT.

United States Patent Office 3,188,485
Patented June 8, 1965

3,188,485
TUNNEL DIODE MEMORY WITH NON-DESTRUCTIVE READOUT

James C. Miller, Hamilton Square, N.J., and Kam Li, Levittown, Pa., assignors, by mesne assignments, to the United States of America as represented by the Secretary of the Navy Filed July 11, 1961, Ser. No. 123,319
2 Claims. (Cl. 307—88.5)

The present invention relates to electronic computer memories and more particularly to electronic computer memories wherein a tunnel diode is utilized as a memory cell.

At the present time the electronic computer is finding more and more applications. Each such application has its own peculiar requirements, many of which can be met, to some degree at least, by presently known devices. Two disadvantages, however, of presently known computers in large scale operations, are their physical size with its resultant large space requirements and their speed of operation which if made faster would result in a reduction in overall cost for any given amount of data processed. Since the physical size of any computer is dependent largely upon the physical size of the computer memory, a great amount of time has been devoted toward increasing the amount of information which can be stored in a memory of any given physical size and further development has been directed at increasing the speed with which the memory may be operated.

It is an object of the present invention to provide a memory element for an electronic computer which will provide greater speed of operation than presently known memories while still retaining the freedom from error which is required of such a device.

Another object is to provide a memory element for an electronic computer which is of small physical size to thereby facilitate packing the elements at high density to conserve space in the computer memory.

In accordance with the present invention, there is provided a tunnel diode memory using one tunnel diode per bit and featuring nondestructive readout. Reading and writing are accomplished by the use of direct current pulses, the readout being capable of detection by an antenna or coil arrangement which senses the output of any bit in the memory plane.

Since the tunnel diode memory cells of this invention are capable of providing rapid operation with a minimum of error, these cells are particularly adapted for use in high speed computers. The circuit elements of the memory of this invention may be made extremely small thus allowing the elements to be closely spaced, and thereby allowing maximum packing density and inherently small space requirements when compared with presently known memories of equal capacity.

Other objects and many of the attendant advantages of this invention will be readily appreciated as the same becomes better understood by reference to the following detailed description and the accompanying drawings wherein.

Figure 1:
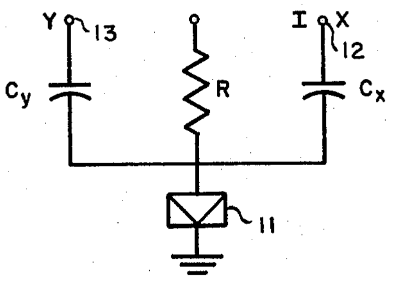
FIG. 1 is a schematic diagram of a basic memory cell representative of the present invention.

Referring now to the drawings, there is shown in FIG. 1 a single memory cell comprising a tunnel diode 11, a resistive load R connected across the tunnel diode, and means for changing the state of or alternatively alternating the state of the tunnel diode 11; said means comprising a pair of coupling capacitors $C_x$ and $C_y$ for coupling to the X and Y selection lines respectively of a computer memory system. A pair of terminals 12 and 13 are provided for connection to the X and Y selection lines respectively.

Figure 2:
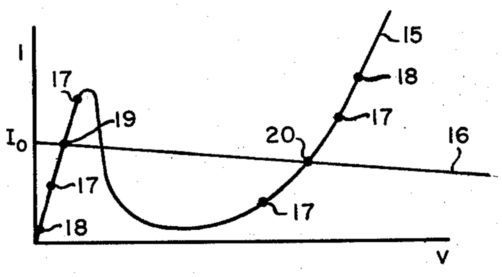
FIG. 2 is a plot of the characteristic curve of the tunnel diode of FIG. 1 showing the bistable load line placed upon it by the current through resistor R of FIG. 1.

Shown in FIG. 2 is the characteristic curve 15 of tunnel diode 11 wherein the current I through tunnel diode 11 is plotted as a function of voltage V applied across the diode. Load line 16 is provided by the resistance R.

Reading and writing are accomplished by applying coincident voltage pulses to coupling capacitors $C_x$ and $C_y$.

To understand the reading and writing process consider that:

$$Q=CV$$

where Q is the charge, C the capacitance and V the potential across any given capacitor, and $$I=\frac{C\Delta V}{\Delta T}$$

I being the current through the capacitor. Thus, current through the diode of FIG. 1 from the coupling capacitors $C_x$ and $C_y$ is determined therefore by the value of the capacitor, the voltage step, and its rise time. The current is adjusted so that full signals from both the X and Y lines are required to switch the diode from the high voltage state to the low voltage state or vice-versa. Half-select signals, that is, a pulse on either the X selection line or the Y selection line but not simultaneous pulses on both, will cause a momentary shift of the load line but will not switch the diode. This is illustrated by points 17 and 18 of FIG. 2 wherein points 17 represent the application of half-select signals (one input) of either polarity and points 18 represent full-select signals (two coincident inputs). Assuming the diode is initially operating in its low voltage stable state (point 19), a select pulse on either the X or Y lines, but not simultaneously on both, will drive it to either of points 17 depending on its polarity, but as soon as the pulse is removed it will return again to its original point 19. However, if the diode is initially operating in its low voltage state and coincident X and Y pulses of positive polarity are applied, the circuit is driven into the negative resistance operating region of the curve and since operation is unstable (oscillatory) in this region it shifts to the high voltage state 20 upon cessation of the pulse. To switch from the high voltage state to the low voltage state, coincident negative X and Y pulses are required. Conversely, if coincident positive pulses are applied when the circuit is in its high voltage state or coincident negative pulses are applied when the circuit is in its low voltage state, there is a momentary shift of the load line from points 20 and 19 respectively to one of points 18, but no change of state occurs.

Thus, it can be seen from the figure that application of a full-select signal will cause switching of the diode from one state to another while half-select signals, although causing a loadline shift from line 16 to one of points 17, will not be sufficient to switch the diode.

Figure 3:
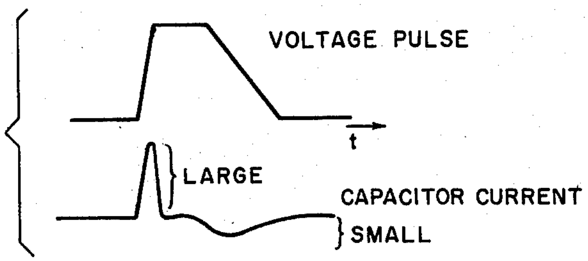
FIG. 3 is a plot of a representative pulse which is applied to the cell of FIG. 1.

The write pulse applied to the cell of FIG. 1 must provide a sharper rise time than fall time. If this were not so, the pulse caused by the leading edge of the pulse would tend to switch the diode to one state while the trailing edge of the pulse would automatically reset it. FIG. 3 illustrates a properly shaped voltage pulse and its effect on capacitor current. It should be noted that the sharp rise provides a large sharply defined current pulse while the trailing edge of the pulse provides only a small current variation.

Figure 4:
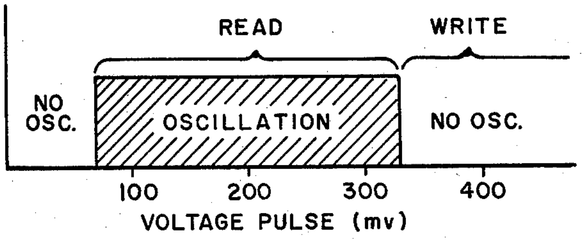
FIG. 4 is a plot of threshold voltages of a typical cell such as that shown in FIG. 1.

In order to read out, smaller voltage pulses, or slower rise time pulses, are applied to the X and Y selection lines. Assuming the selected diode is in the low state initially, a properly adjusted reading pulse will cause the selected diode to move momentarily into the negative resistance region of its characteristic but the diode will not switch to the high state. While the diode is in the negative resistance region, oscillations will occur at a frequency determined by the stray reactances of the circuit. Thus this type of readout exhibits the unique feature that the diode goes into an unstable oscillation state after application of a read pulse but that it will always return to its original state if the circuit parameters are properly chosen. In operation, the pulse amplitudes are adjusted such that a high state diode will not enter the negative resistance region and hence will not oscillate. FIG. 4 shows a typical range of voltage pulse amplitudes over which the circuit is caused to oscillate. The actual values depend on the values of $C_x$ and $C_y$ etc. It will be seen from the figure that adequate threshold exists for X–Y coincidences both for reading and writing. Although oscillations are produced during a portion of the normal write cycle, no cause for confusion exists since read output during the write cycle is ignored.

Figure 5:
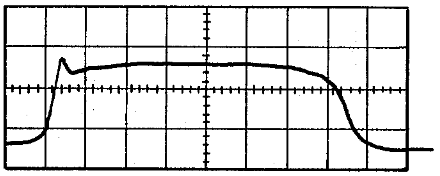
FIG. 5 is a plot of a read voltage pulse applied to one of the capacitors of FIG. 1.
Figure 6:
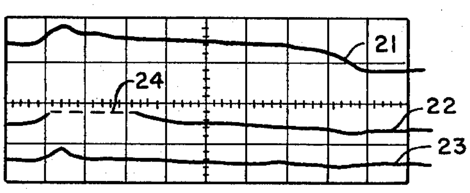
FIG. 6 is a series of plots of tunnel diode voltages under various conditions of proper operation in a circuit such as that shown in FIG. 1.

FIGS. 5 through 9 illustrate oscilloscope waveforms which are illustrative during the read and write cycles. FIG. 5 shows the waveform of a voltage pulse applied to either one of the capacitors. FIG. 6 shows the effect of the read voltage pulse being applied to the capacitors $C_x$ and/or $C_y$ on the tunnel diode voltage. Curve 21 is the tunnel diode voltage when the circuit is in its high state and full select pulses are applied (pulses are applied both to $C_x$ and $C_y$). It is seen that no oscillation occurs since the curve is continuous throughout its entirety. Although the broken line is illustrative of the oscillatory range, it will be realized that with an oscilloscope having sufficient bandwidth the actual oscillations could be portrayed. These oscillations of course can be detected by other means known in the art.

Curve 22 is representative of the tunnel diode voltage when the diode is in its low state and full select pulses are applied. In this case the broken portion 24 of the curve is indicative of oscillations of period and amplitude corresponding to the inherent circuit constants. These oscillations can be detected to thus provide an output to the sensing circuits of the computer memory system. Detection of these oscillations can be accomplished, for example, by an antenna or coil tuned to the output frequency. Curve 23 shows the tunnel diode voltage when a half-select pulse is applied to the circuit (a pulse is applied either to $C_x$ or $C_y$, but not to both coincidently). It will again be seen that no oscillations occur and no change of state takes place.

Figure 7:
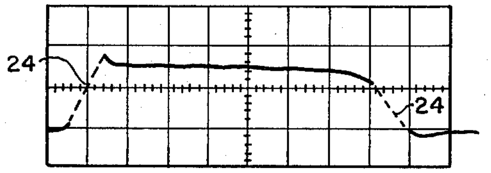
FIG. 7 is a plot of tunnel diode voltage which is improperly adjusted.
Figure 8:
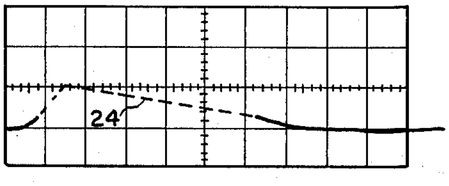
FIG. 8 is a plot of tunnel diode voltage when the tunnel diode cell is in the low state and a large pulse is applied.
Figure 9:
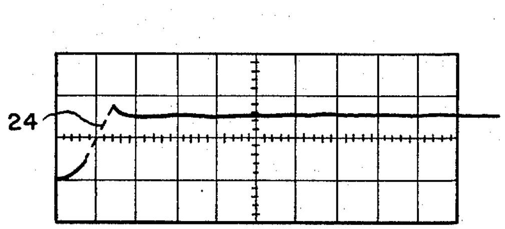
FIG. 9 is a plot of a correctly adjusted tunnel diode voltage.

Referring now to FIG. 7, there is shown the voltage across the tunnel diode when the write voltage pulse applied to the selection capacitors has too sharp a trailing edge. In this case although oscillations occur the capacitor current (FIG. 3) develops a trailing edge pulse which is sufficient to cause switching of the tunnel diode from one state to another. FIG. 9 shows a curve similar to FIG. 7 but with a correctly adjusted trailing edge. It will be noted that no reverse switching occurs and oscillations occur only over a short portion of the curve.

FIG. 8 again shows tunnel diode voltage when a large read pulse, but a correctly shaped pulse, is applied to the selection capacitors. It will be noted that although oscillations occur for a longer period of time than those of curve 22 of FIG. 6, the diode still exhibits no reverse switching, thus indicating that the readout remains nondestructive.

During readout in each case the number of cycles of oscillation is a nonlinear function of the amplitude of the voltage pulse, rise time, and of the circuit parameters. Up to a point, raising the select pulse amplitude increases the number of cycles of oscillation. Any number from one to several hundred cycles may be obtained without causing the diode to switch states. For high speed readout, the minimum number of cycles that can be detected by the sensing system is the number of cycles which is most desirable. The frequency of oscillation is set by the tunnel diode capacity, lead inductance, and other circuit parameters. Because of the highly nonlinear nature of the circuit, it is difficult to obtain a useful analytic expression relating these factors.

Although the curves shown in this specification have illustrated the use in readout of oscillation in the low voltage state and lack of oscillation in the high voltage state as a means of determining the state of the selected memory cell, it will be obvious to those skilled in the art that by adjustment of the loadline it is possible to obtain oscillation readout for the high state and no oscillation for the low state.

Obviously other modifications and variations of the present invention are possible in the light of the above teachings. It is therefore to be understood that within the scope of the appended claims the invention may be practiced otherwise than as specifically described.

What is claimed is:

1. A method of storing and reading information in an electronic computer memory comprising providing a tunnel diode, a resistive load connected to said tunnel diode and a pair of coupling capacitors connected to a pair of selection lines; adjusting the current through said resistive load so that the tunnel diode has two stable states, writing digital information into the diode by applying respective write voltage pulses coincidentally to said coupling capacitors, each of said write voltage pulses having a sharper rise time than fall time and the algebraic sum of said pulses being of sufficient amplitude to cause said tunnel diode to change from one of said two stable states to the other depending on the polarity of the write pulses but each of said write pulses being of insufficient amplitude to cause change of state if applied to only one of said pair of coupling capacitors, and reading said digital information by determining the state of said diode, said reading being accomplished by applying respective read voltage pulses coincidentally to said coupling capacitors, said read voltage pulses having insufficient amplitude to cause said diode to change state when applied to one of said pair of coupling capacitors, but having sufficient amplitude only when applied coincidentally to cause unstable oscillation when said diode is in a predetermined one of said two stable states, said oscillation thereby being indicative of the state of said tunnel diode.

2. A method of writing and reading digital information in an electronic computer memory comprising providing a storage element having two stable states, one of said states being at a relatively low voltage and a second of said states being at a relatively high voltage, said element exhibiting a negative resistance at predetermined voltages between said two stable states, capacitively coupling said storage element to a pair of selection lines, coincidentally impressing respective voltage pulses on said pair of selection lines, each of said voltage pulses having a relatively sharp rise time as compared with fall time and said pulses together having sufficient amplitude to cause said element to switch from one state to the other, the amplitude of each of said voltage pulses however being insufficient to cause switching if not applied coincidentally to both selection lines; and reading said information by coincidentally applying to said pair of selection lines a voltage pulse of insufficient amplitude to cause said storage element to change state but sufficient to drive it into the range of negative resistance.

References Cited by the Examiner

UNITED STATES PATENTS

| | | | |
|---|---|---|---|
| 2,986,724 | 5/61 | Jaeger | 331—115 X |
| 3,017,613 | 1/62 | Miller | 307—88.5 |
| 3,054,070 | 9/62 | Rutz | 307—88.5 |

ARTHUR GAUSS, *Primary Examiner.*